UNITED STATES PATENT OFFICE.

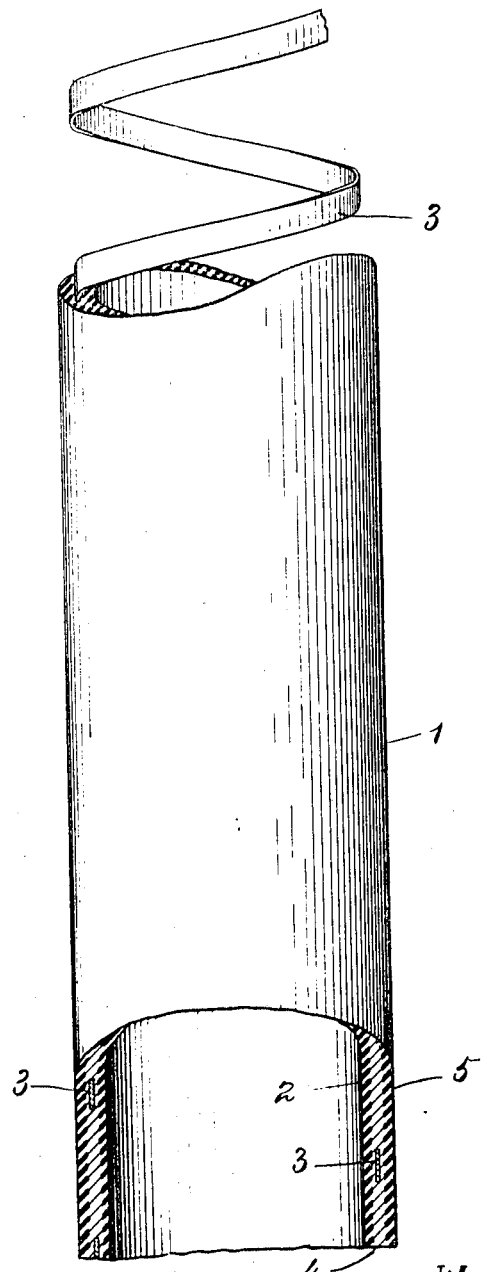

WALTER H. JUVE AND HARRY A. HOFFMAN, OF AKRON, OHIO, ASSIGNORS TO THE B. F. GOODRICH COMPANY, OF NEW YORK, N. Y., A CORPORATION OF NEW YORK.

REINFORCED HARD-RUBBER PIPE.

1,314,670.    Specification of Letters Patent.    Patented Sept. 2, 1919.

Application filed August 31, 1918. Serial No. 252,247.

*To all whom it may concern:*

Be it known that we, WALTER H. JUVE and HARRY A. HOFFMAN, citizens of the United States, residing at Akron, in the county of Summit and State of Ohio, have invented a certain new and useful Reinforced Hard-Rubber Pipe, of which the following is a specification.

This invention relates to the construction of rubber pipe for conducting corrosive fluids, such for example as tanning liquor, and especially hot fluids of this character, whose temperature is such as might cause the rubber to soften and the pipe to sag if not suitably reinforced. The object of our invention is to effectively reinforce the pipe, and it consists in the improvements hereinafter described and claimed.

The drawing shows a side elevation of a length of pipe embodying our invention, partly in section and partly broken away.

1 is the pipe, whose wall includes an inner tubular layer 2 of hard vulcanized rubber suited to withstand the corrosive action of the conducted fluid. As a reinforcing element, we may employ any suitable metallic structure, but prefer to use a flat steel ribbon or strip 3 wound into the form of a helix constituting a structure of generally tubular form which surrounds the aperture of the pipe, as this is easily applied and furnishes the requisite strength and stiffness, while possessing sufficient flexibility to permit slight deflections and expansions or contractions of the pipe within the limit of elasticity of the hard rubber when cold. In order to distribute the expanding and contracting strains and otherwise to allow for the differences in character of the metal and hard hubber both in the manufacture and use of the pipe, we prefer to embed the metal helix in a tubular layer 4 of soft vulcanized rubber surrounding the inner hard rubber layer 2; and to further stiffen and protect the pipe on its outer surface, we inclose the soft rubber layer in a tubular outer layer 5 of hard rubber, all of said layers being united together by vulcanization. The pipe is thus composed of hard rubber in which is embedded a metal reinforcing helix immediately incased in soft rubber.

We do not desire to be limited to this exact construction, but contemplate any suitable modification within the scope of our claims.

We claim:

1. A pipe having a wall comprising hard rubber in which is embedded a metallic reinforcement immediately incased in soft rubber.

2. A pipe comprising inner and outer tubular layers of hard rubber, an interposed tubular layer of soft rubber united to the hard rubber by vulcanization, and a metallic reinforcement embedded in the soft rubber.

3. A pipe having a wall comprising an inner tubular layer of hard vulcanized rubber, a layer of soft vulcanized rubber surrounding and united to said inner layer, a metal helix also surrounding the inner layer and embedded in the soft rubber, and an outer tubular layer of vulcanized hard rubber surrounding and united to the soft rubber layer.

4. A pipe having inner and outer surfaces of hard rubber, an embedded, flat, helical, metal reinforcing strip, and soft rubber surrounding said strip and inclosed in the hard rubber.

In testimony whereof we have hereunto set our hands this 30th day of August, 1918.

WALTER H. JUVE.
HARRY A. HOFFMAN.